Dec. 5, 1967 R. PANNETIER 3,355,940
DEVICE FOR THE STUDY OF ATMOSPHERIC LAYERS
Filed March 1, 1965 2 Sheets-Sheet 2

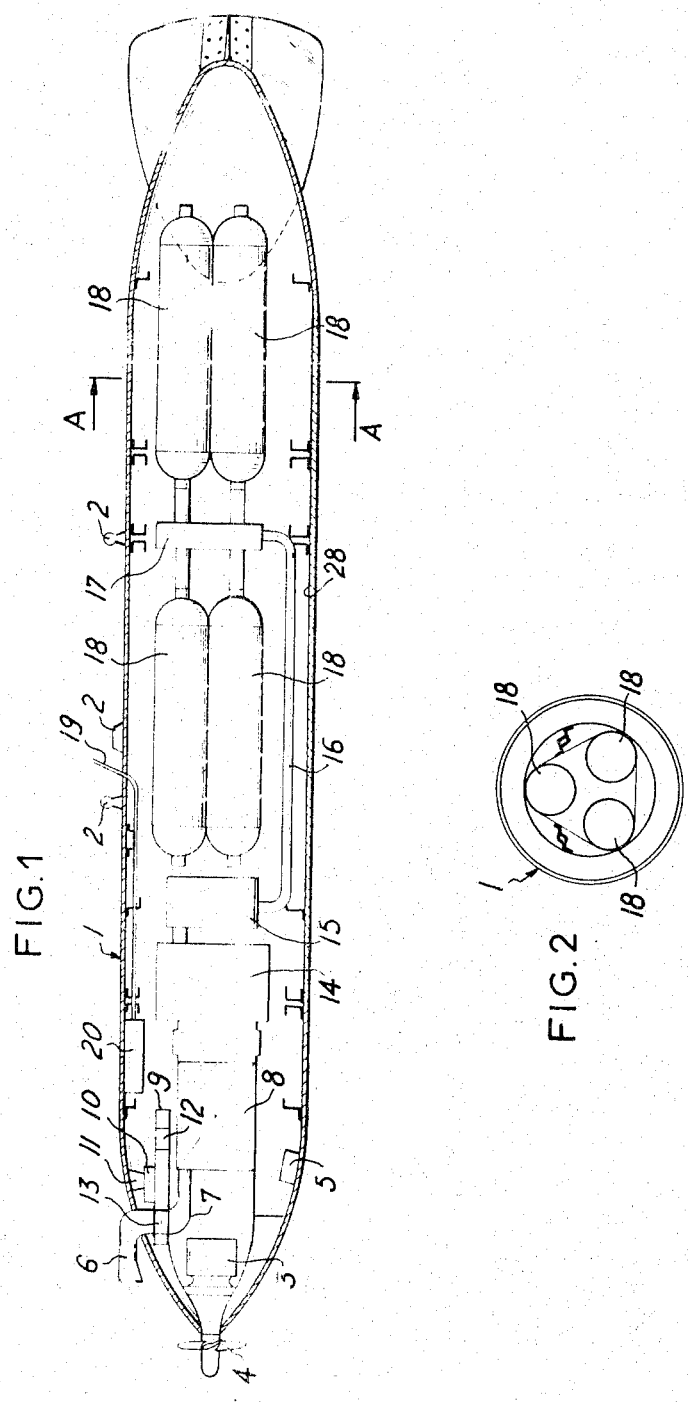

United States Patent Office 3,355,940
Patented Dec. 5, 1967

3,355,940
DEVICE FOR THE STUDY OF ATMOSPHERIC LAYERS
Raymond Pannetier, Massy, France, assignor to Commissariat à l'Energie Atomique, Paris, France
Filed Mar. 1, 1965, Ser. No. 435,870
Claims priority, application France, Mar. 5, 1964, 966,211
5 Claims. (Cl. 73—170)

The present invention has for its object a device for the study of atmospheric layers which forms an independent, self-contained assembly and is designed to be fixed on aircraft of any type for the purpose of automatically taking air samples at different altitudes.

It is known in this field that, when it is desired, for example, to study the nature of particles which may be found in suspension in certain air layers of the atmosphere, to extract by means of an air intake placed on an aircraft traveling through the layers to be studied samples which are compressed in cylinders for purposes of subsequent analysis.

A large number of manual operations are necessary at the various altitudes considered and problems also arise in connection with atmospheric pressure, air temperature and the presence of certain elements which are a source of hindrance to the effective achievement of sampling operations.

The aim of this invention is to overcome the disadvantages which have been noted above.

Accordingly, the invention is concerned with a device for the study of atmospheric layers wherein said device comprises a conduit which is provided with an orifice for the admission of atmospheric air, a compressor for compressing the air which is thus admitted, means for interposing successively a plurality of filters on the path of the airstream within said conduit, a plurality of cylinders for receiving the compressed atmospheric air, connection means for connecting each of said cylinders to the delivery end of the compressor.

In accordance with further characteristic features of the invention, provision is made for a barrel which is designed to carry as many filters as there are cylinders mounted within the chamber, and each filter is constituted by a cartridge in which is fitted a metallic cone screen which is heated electrically and placed in front of a filter membrane, the periphery of the base of the cone screen being placed level with an annular chamber which is filled with water-retentive material.

There will now be described in reference to FIGURES 1 to 4 of the accompanying drawings one particular form of embodiment of the device in accordance with the invention which is given solely by way of indication and not in any limiting sense.

Figure 3:
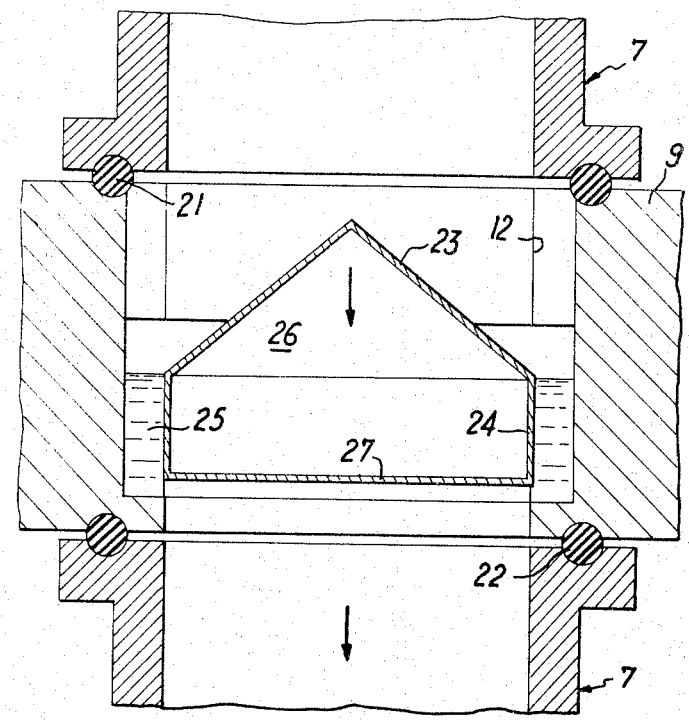
Figure 4:
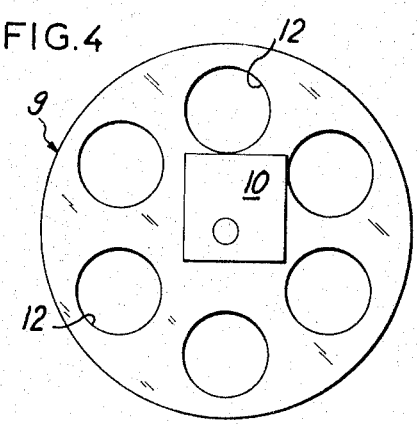

FIG. 1 is an axial sectional view of the device according to the invention;
FIG. 2 is a transverse sectional view along the line A—A of FIG. 1;
FIG. 3 is a sectional view of a filter cartridge;
FIG. 4 is a diagrammatic representation of the cartridge-holder barrel.

There is shown in FIG. 1 a streamlined nacelle 1 which forms the casing of the device in accordance with the invention. Said streamlined nacelle, which can have the overall dimensions and shape of a conventional detachable fuel-tank, is secured to the exterior of an aircraft of any type by means of brackets such as the bracket 2.

In the front portion of the streamlined nacelle, there is disposed an electric generator 3 driven by a propeller 4 which is fixed externally to the front end of the nacelle.

Said generator supplies the electric power which is necessary for the supply of a number of different control units which form part of the device. A current supply point 5 permits the connection of an external electric supply for such purposes, for example, as ground testing and adjustments.

An air-intake horn 6 projects from the front end of the nacelle over a distance which is sufficient to ensure that air is drawn in through said horn outside the turbulent layer which is generated during flight against the nacelle casing. The air-intake horn constitutes the extremity of a conduit 7 which terminates in a first compressor set 8. The layout of the compressor is preferably in a straight line, in such a manner as to prevent any deposit from forming on the upstream side of the filter.

A barrel 9 and its step-by-step rotary control system 10 (as shown in particular in FIG. 4) are secured at 11 to the interior of the casing 1. Said barrel is provided with a series of chambers arranged in a circle, each chamber being intended to contain a filter cartridge such as the cartridge 12. By causing the barrel to rotate, the cartridges can be successively interposed in the path of the airflow within the conduit 7. Said conduit is interrupted in a zone 13, into which one of the cartridges of the barrel is inserted in air-tight manner as will be described hereinafter.

The compressor set 8, the electric motor of which is supplied by the generator 3, is intended to bring the air admitted through the conduit 7 to atmospheric pressure. On account of the altitude, this air is in fact at a pressure which is below normal; the air is cooled within an exchanger which has not been shown in the drawings and then flows into a second compressor set 14 which brings it to a pressure of the order of 200 bars. Then, after having passed through a second cooling exchanger 15, the air is conveyed through a pipe 16 to a distributor 17. Said distributor is connected via an electrovalve to a series of air-cylinders such as the cylinder 18. In the particular case described, provision has been made for two sets of three air-cylinders arranged as shown in FIG. 2.

A conventional detachable fuel-tank is normally connected to the aircraft which carries it by means of a cable which transmits to the pilot the indications of a fuel-level gauge. In the device described, a similar cable is employed and connected to the aircraft in the same manner. The cable referred to, which is designated by the reference 19 in FIG. 1, comprises a suitable number of conductors for the purpose of providing a connection on the one hand between a relay box 20 of the nacelle and, on the other hand, an altimeter and visual indicator which are placed in the aircraft.

Each time a predetermined altitude is reached, the altimeter transmits a signal into the relay box 20, thus initiating a series of operations within the nacelle. The control unit 10 of the barrel 9 causes this latter to rotate so as to place a fresh cartridge within the housing 13 of the conduit 7. An electrovalve of the distributor 17 is actuated so as to put the pipe 16 into communication with one of the air-cylinders, and the compressor sets 8 and 14 are started up.

When the pressure within the air-cylinder considered reaches the value which corresponds to the desired extent of filling, a pressure contact which forms part of the distributor 17 initiates the closure of the electrovalve and the stoppage of the compressors. At the same time, the said pressure contact transmits through the cable 19 a signal which lights up the visual indicator on board the aircraft. The pilot is therefore informed of the completion of an air-admission or sampling operation at the altitude which has been chosen, and can therefore move to the following predetermined altitude. When this altitude is reached, the altimeter initiates a further cycle of operations in the same manner as hereinabove described.

The barrel 9 carries a number of filter cartridges corresponding to the number of air-cylinders and therefore to the number of air samples to be taken. FIG. 3 shows diagrammatically the manner in which each cartridge is constructed. The conduit 7 is fitted on each side of the barrel 9 with O-ring seals 21 and 22 which ensure air-tightness with the cartridge 12 in position. The cartridge comprises a metallic cone screen 23 which can be heated electrically by means of conductors which have not been shown in the drawings. The periphery of the base of the cone screen corresponds to the internal wall 24 of an annular chamber 25 which is lined with a water-retentive substance such as silica gel. The chamber 26 which is formed by the screen 23 and the wall 24 is closed at the bottom by a filter membrane 27.

The cold air which is collected at high altitude and the moisture of which is transformed into ice particles passes successively through the screen 23 and through the filter membrane 27. The ice particles melt on the heated screen and the water which is formed is absorbed into the annular chamber 25. It is therefore dry air which flows through the filter membrane 27, then penetrates into the compression and storage circuit.

In order to facilitate the positioning of the air-cylinders within the nacelle 1, the bottom of said nacelle is fitted with a door 28 of suffcient width to admit a frame which has not been illustrated and on which the air-cylinders are mounted. In order to permit the disassembly and positioning of the air-cylinders, each cylinder is fitted with a hand-operated valve located on the downstream side of the corresponding electrovalve.

In one form of embodiment of the invention, the nacelle has length of the order of 5 meters and a diameter of the order of 60 centimeters. The generator 3 is an alternator having a power rating of 12 kw. at a frequency of 400 c./s. The first compressor set has a power rating of the order of 2 kw. and the second set has a power rating of the order of 6 kw. The air-cylinders have a unitary capacity of 25 liters.

A complete analysis of the air which is drawn off at a predetermined altitude, in regard to the composition, matter in suspension, radioactivity and so forth, is carried out on one sampling unit which consists of the contents of one cylinder as well as the substances (fluids, dust particles, aerosols) which have been retained by the corresponding filter cartridge.

The device as hereinabove described makes it possible to take air samples at six different altitudes under optimum conditions of speed and ease of operation. The device also permits the use, for the purpose of taking these samples, of any type of aircraft which can be equipped with a detachable tank without requiring structural modifications of any kind.

What I claim is:
1. Device for the study of atmospheric layers comprising a conduit provided with an orifice for the admission of atmospheric air, a compressor for compressing the air in said conduit, means for interposing successively a plurality of filters on the path of the airstream within said conduit upstream of said compressor, a plurality of cylinders for receiving the compressed air from said compressor and connection means for successively connecting one of said cylinders to said compressor for each of said filters simultaneously with the interposition of each of said filters in said conduit.

2. Device in accordance with claim 1, including an electric generator, a propeller driving said generator and driven by displacement of the device through the atmosphere, said generator supplying power to said compressor.

3. Device in accordance with claim 1 including a pressure contact in said conection means responsive to the pressure in said one of said cylinders controlling the stopping of said compressor.

4. Device in accordance with claim 1 including means for attaching said device to an aircraft, an altimeter for the aircraft and a connecting cable for transmitting a signal from said altimeter to a relay controlling said means for interposing said filter; controlling starting of said compressor, and controlling said connection means.

5. Device in accordance with claim 1, each of said filters comprising a metallic screen heated by electricity, a mass of water-retentive material and a filter membrane.

References Cited

UNITED STATES PATENTS

| | | | |
|---|---|---|---|
| 2,489,654 | 11/1949 | Main-Smith et al. | 73—421.5 X |
| 3,059,470 | 10/1962 | Baldwin et al. | 73—170 X |
| 3,077,779 | 2/1963 | Froehlich et al. | 73—179 X |
| 3,109,724 | 11/1963 | Heckman et al. | 73—179 |
| 3,252,323 | 5/1966 | Torgeson | 73—28 X |

OTHER REFERENCES

Flight Handbook, Model F8u–1E Aircraft, Navweps 01-45HHA–501, Bureau of Naval Weapons, Washington D.C., June 15, 1961, pp. 13 and 14 relied on.

RICHARD C. QUEISSER, *Primary Examiner.*

J. J. SMITH, J. W. MYRACLE, *Assistant Examiners.*